(12) United States Patent
Ganjian

(10) Patent No.: US 10,227,257 B2
(45) Date of Patent: Mar. 12, 2019

(54) CEMENT BINDER

(71) Applicant: COVENTRY UNIVERSITY, Coventry (GB)

(72) Inventor: Eshmaiel Ganjian, Coventry (GB)

(73) Assignee: COVENTRY UNIVERSITY, Coventry (GB)

( * ) Notice: Subject to any disclaimer, the term of this patent is extended or adjusted under 35 U.S.C. 154(b) by 360 days.

(21) Appl. No.: 14/786,864

(22) PCT Filed: Apr. 25, 2014

(86) PCT No.: PCT/GB2014/051300
§ 371 (c)(1),
(2) Date: Oct. 23, 2015

(87) PCT Pub. No.: WO2014/174312
PCT Pub. Date: Oct. 30, 2014

(65) Prior Publication Data
US 2016/0068433 A1    Mar. 10, 2016

(30) Foreign Application Priority Data
Apr. 26, 2013    (GB) .................................. 1307622.9

(51) Int. Cl.
*C04B 7/153* (2006.01)
*C04B 28/08* (2006.01)
(Continued)

(52) U.S. Cl.
CPC ................ *C04B 7/153* (2013.01); *B28B 1/16* (2013.01); *C04B 7/17* (2013.01); *C04B 28/08* (2013.01);
(Continued)

(58) Field of Classification Search
CPC .. B28B 1/16; C04B 7/17; C04B 7/153; C04B 28/08; E01C 5/065; E01C 5/22; E04C 1/00
See application file for complete search history.

(56) References Cited

U.S. PATENT DOCUMENTS

2008/0017077 A1* 1/2008 Abbate ................. C04B 18/027
106/679

FOREIGN PATENT DOCUMENTS

GB          2375347 A       11/2002
JP       2013-006743 A        1/2013
(Continued)

OTHER PUBLICATIONS

Khater, H.M. Effect of cement kiln dust on Geopolymer composition and its resistance to sulphate attack. International Journal of Civil and Structural Engineering vol. 2, No. 3, 2012. (Year: 2012).*
(Continued)

*Primary Examiner* — John E Uselding
(74) *Attorney, Agent, or Firm* — Withrow & Terranova, P.L.L.C.; Vincent K. Gustafson

(57) ABSTRACT

The invention provides a binder composition comprising: (a) ground granulated blast furnace slag (GGBS), (b) basic oxygen slag (BOS), and (c) an alkaline inorganic waste material selected from by-pass dust (BPD), cement kiln dust (CKD), and mixtures thereof. The use of such a composition as a binder in a concrete mix, concrete mixes comprising such a composition, methods of manufacturing concrete articles, and concrete articles such as paving blocks are also provided.

20 Claims, 4 Drawing Sheets

(51) Int. Cl.
  *C04B 7/17*   (2006.01)
  *B28B 1/16*   (2006.01)
  *E01C 5/06*   (2006.01)
  *E01C 5/22*   (2006.01)
  *E04C 1/00*   (2006.01)
  *C04B 111/10* (2006.01)

(52) U.S. Cl.
  CPC ............... *E01C 5/065* (2013.01); *E01C 5/22* (2013.01); *E04C 1/00* (2013.01); C04B 2111/1037 (2013.01); Y02P 40/143 (2015.11); Y02W 30/94 (2015.05); Y02W 30/95 (2015.05)

(56) References Cited

FOREIGN PATENT DOCUMENTS

| WO | 98/14410 A1 | 4/1998 |
| WO | 00/00448 A1 | 1/2000 |
| WO | 2009/064929 A2 | 5/2009 |

OTHER PUBLICATIONS

International Preliminary Report on Patentability (including forms PCT/IB/326, PCT/IB/373, PCT/ISA/237) for International Patent Application No. PCT/GB2014/051300, dated Nov. 5, 2015, 8 pages.

Search Report for United Kingdom Application No. GB1307622.9 dated Jun. 4, 2013, 3 pages.
International Search Report (Form PCT/ISA/210) and Written Opinion (Form PCT/ISA/237) for International Patent Application No. PCT/GB2014/051300 dated Oct. 14, 2014, 12 pages.
Lizarazo-Marriaga, J. et al., "Effect of Steel Slag and Portland Cement in the Rate of Hydration and Strength of Blast Furnace Slag Pastes", Journal of Materials in Civil Engineering, Ision, US, vol. 23, No. 2, pp. 153-160, Feb. 1, 2011.
Chaunsali, P. et al., "Evolution of strength, microstructure and mineralogical composition of a CKD-GGBFS binder", Cement and Concrete Research, Elsevier Ltd., vol. 41, No. 2, pp. 197-208, Feb. 1, 2011.
Abo-El-Enein, S.A. et al., "Hydration Characteristics of Mixtures of By-Pass Dust and Slag", Zement-Kalk-Gips-Zkg International, Bauverlag BV., Getersloh, Germany, vol. 54, No. 3, pp. 158-160,163, Mar. 1, 2001.
Sadeghi Pouya, H. et al., "Development of novel cementitious binders using plasterboard waste and pozzolanic materials for road bases", International Conference on Sustainable Construction Materials and Technologies; Jun. 11, 2007 to Jun. 13, 2007, Coventry, United Kingdom, Taylor & Francis Group, UK, ISBN 978-0-415-44689-1.
Sadeghi Pouya, H. et al., "Strength Optimization of Novel Binder Containing Plasterboard Gypsum Waste", ACI Materials Journal, American Concrete Institute, Farmington Hills, MI, US, vol. 104, No. 6, pp. 653-659, Nov. 1, 2007.

* cited by examiner

CEMENT BINDER

This application is a 35 U.S.C. § 371 national phase filing of International Application No. PCT/GB2014/051300 filed on Apr. 25, 2014, and further claims priority to United Kingdom Patent Application No. 1307622.9 filed on Apr. 26, 2013, with the disclosures of the foregoing applications hereby being incorporated by reference herein in their respective entireties.

The present invention relates to a novel cementitious mix formed from industrial waste materials which finds particular use in the production of paving blocks and roller compacted concrete (RCC) construction materials. As an alternative to traditional Portland cement, this provides the potential to construct materials with a reduced carbon footprint without adversely affecting their durability and other physical characteristics.

Concrete remains an important construction material. It is a composite material comprising aggregate, sand, cement, and optionally additional materials such as admixtures and reinforcements. Aggregate consists of chunks of material, typically relatively large fragments. Typically these are coarse gravel, crushed rocks, such as limestone or granite, or other similar materials. Often aggregate is supplemented by sand. Cement is the binder which sets and hardens in order to bind the particles of the aggregate together. The most common cements comprise pozzolans: siliceous or siliceous and aluminous materials which, when finely divided and in the presence of water, will react chemically with calcium hydroxide or other alkalis at ordinary temperatures to form compounds possessing cementitious properties (see standard ASTM C618).

Conventional concrete compositions typically employ Portland cement, often abbreviated to 'OPC' or Ordinary Portland Cement. Portland cement is made by heating limestone (calcium carbonate) with small quantities of other materials (such as clay) to very high temperatures in a process known as calcination, whereby a molecule of carbon dioxide is liberated from the calcium carbonate to form calcium oxide, or quicklime, which is then blended with the other materials in the mix. The resulting hard substance, called 'clinker', is then ground with a small amount of gypsum into a powder. Portland cement consists of at least two-thirds by mass of calcium silicates ($3CaO.SiO_2$ and $2CaO.SiO_2$), the remainder consisting of aluminium- and iron-containing clinker phases and other compounds. The ratio of CaO to $SiO_2$ is typically not less than 2.0, while the magnesium oxide content (MgO) does not exceed 5.0% by mass. Portland cement is thus typically a combination of tricalcium silicate, dicalcium silicate, tricalcium aluminate, tetracalcium aluminoferrite, and gypsum.

On an annual basis, Portland cement is produced in an amount of about 1.6 billion tonnes. The production of every tonne of Portland cement releases approximately 1 tonne of carbon dioxide ($CO_2$)—a major contributor to the greenhouse gas emissions responsible for global warming. Its production is therefore estimated to be responsible for 7 to 8% of annual global $CO_2$ emissions.

Cementitious paste in the form of pre-cast paving blocks is widely used for a wide range of applications including exterior landscaping. The appeal of paving blocks is that they are able to provide a hard surface which is visually attractive (the blocks are available in a number of different shapes and colours), and easy to walk upon while at the same time allowing for easy maintenance and having a long life in use. They can therefore be used for most heavy duty purposes, being able to cope with considerable loads as well as offering resistance to those forces that might shear or otherwise damage their surface. At present, Portland cement is an essential component in all paving blocks. In their manufacture, the minimum amount of cement used is 200 kg per $m^3$ (but is often in the range of 300 to 400 kg/$m^3$).

Ongoing attempts have been made to find suitable materials to replace (completely, or in part) Portland cement. A number of these materials, such as natural pozzolan, limestone and metakaolin occur naturally while other artificial (industrial) pozzolans, such as fly ash, slag which has been produced by certain metallurgy processes, silica fume and others are the by-products of other industries. Using more waste materials decreases their effect on the environment and helps to save natural raw materials as well as reducing the overall energy required to produce a cementitious material and thereby reduce $CO_2$ emissions.

The present invention addresses the need for alternative materials to Portland cement thereby reducing the carbon footprint of the construction industry. Such a goal is desirable from the point of view of combating global warming.

We have now surprisingly found that Portland cement can be replaced by a novel binder comprising a mixture of mineral waste and industrial by-products, more specifically a mixture of ground granulated blast furnace slag (GGBS) and basic oxygen slag (BOS) together with an alkaline inorganic waste material, such as by-pass dust (BPD) or cement kiln dust (CKD). Such compositions not only provide a reduced $CO_2$ footprint, but enable a semi-dry construction method which has excellent quality, constructability and environmental efficiency. Concrete formed from such compositions is particularly suitable for use as RCC (Roller Compacted Concrete) construction materials, for example in the production of pavement layers or paving blocks.

The compositions of the invention provide a further environmental benefit by re-using industrial/mineral waste materials. This will lead to a reduction in the stockpile of such waste materials, thus decreasing their impact on the environment and easing the problems associated with the disposal of waste materials to landfill. Economic benefits should also be felt by industry due to the reduced waste disposal costs and freedom from complex laws and regulations relating to the disposal of waste material. Concrete producers will also benefit from lower production costs due to the ready availability and low cost of industrial waste.

A further benefit associated with the compositions of the present invention is that a lower water content is required than with conventional Portland cement-concrete compositions. The lower water content gives rise to a significant increase in the compressive strength of paste and concrete mixtures formed using the novel compositions, as well as increasing the attractiveness of these for use as an alternative to Portland cement in the production of RCC and vibropressing compaction construction materials such as paving blocks, in which a semi-dry method is used for casting.

Thus, in a first aspect, the invention provides a binder composition comprising:
  (a) ground granulated blast furnace slag (GGBS),
  (b) basic oxygen slag (BOS), and
  (c) an alkaline inorganic waste material selected from by-pass dust (BPD), cement kiln dust (CKD), and mixtures thereof GGBS is a non-metallic by-product produced from a blast furnace when iron ore is reduced to pig iron. The slag in liquid form is rapidly cooled to form a granulate pozzolan. This can then be crushed and milled to produce a fine grain which presents as a fine white powder. The exact composition of GGBS will depend on the exact conditions and materials found in the blast furnace, but GGBS typically comprises as its major components CaO and $SiO_2$. Other typical components include $Al_2O_3$ and MgO and other bases that are developed in a molten condition simultaneously with iron in a blast furnace. Typically GGBS will comprise CaO in a range of about 30-50% and $SiO_2$ in a range of about 28-38% by weight on a dry solids basis. GGBS typically contains less than 1 wt. % crystalline silica and less than 1 ppm water-soluble chromium (IV). Silicates and alumina silicates of calcium, when present, will generally constitute approximately 99 wt. % of the GGBS. Its particles are irregular with a relative density (specific gravity) of about 2.9 $kg/m^3$. The chemical composition of oxides in GGBS is similar to that of Portland cement but the proportion varies (see e.g. Dubey et al., International Journal of Scientific & Engineering Research, Vol. 3, Issue 8, 2012). GGBS suitable for use in the invention is widely available and may be obtained from a number of sources. It is generally sold with a composition conforming to the criteria set out under the BS EN 15167-1:2006 standard.

Basic oxygen slag (BOS), also known as steel slag dust or LD-converter slag, is a by-product that results when iron is either converted to steel using a basic oxygen furnace or from melting scrap to make steel in an electric arc furnace. The basic oxygen process is described by Caiju, S., Journal of Materials in Civil Engineering, Vol. 16(3): 230-236, 2004. In this process the hot metal is treated by blowing oxygen to remove carbon and other elements that have a high affinity to oxygen. The slag is generated by the addition of fluxes, such as limestone and/or dolomite that combine with silicates and oxides to form liquid slag. Some amounts of scrap are also added in order to control the temperature of the exothermal reactions. When the reaction process is complete, molten crude steel collects on the bottom of the furnace and the liquid slag floats on top of it. The crude steel and the slag are tapped into separate ladles/pots at temperatures typically above 1600° C. After tapping, the liquid slag in the pot can further be treated by injection of $SiO_2$ and oxygen in order to increase volume stability. The molten slag is then poured into pits or ground bays where it air-cools under controlled conditions forming crystalline slag. In order to adjust the required technical properties for a specific use, different measures like weathering, crushing and/or sieving may be performed on the crystalline slag.

BOS suitable for use in the invention may be obtained from a number of sources. One particular supplier is Tarmac UK. Prior to use in the binder compositions according to the invention, this material may be ground or milled using conventional grinding methods and optionally sieved in order to provide a material having a selected particle size distribution.

By-pass dust (BPD) is a by-product of the manufacture of Portland cement collected from the kiln. The by-pass is used to bleed off volatile materials that would otherwise re-circulate around the kiln and pre-heater system (condensing in cooler parts of the kiln causing blockages) or eventually end up in the cement clinker. Cement by-pass dust and cement kiln dust (CKD) are produced at different temperatures. CKD is taken out of the kiln during its initial length (from electrostatic precipitators in the chimney stack) at a temperature of 300° C. while BPD is taken out from part of the kiln (the bypass) where the temperature is about 1000° C. As a result, BPD contains more cementitious phases compared with CKD, which contains a higher amount of calcium carbonate (limestone).

Typical CKD compositions will comprise $CaCO_3$ as a major component along with smaller amounts of $SiO_2$ and other materials. Examples of CKD compositions may be found in Haynes, B. W., and Kramer, G. W., *Characterization of U.S. Cement Kiln Dust, Bureau of Mines*, United States Department of Interior, Washington, D.C., USA, Information Circular #8885, 1982.

Table 1 below provides an analysis of a typical CKD composition, taken from the reference cited above. This is provided purely for illustrative purposes. As would be recognised by those of skill in the art, a wide range of alternative CKD compositions exist and would be equally appropriate for use in the binder compositions of the invention.

TABLE 1

Typical Composition of Cement Kiln Dust (Haynes and Kramer, 1982)

| Constituent | % by weight |
|---|---|
| $CaCO_3$ | 55.5 |
| $SiO_2$ | 13.6 |
| CaO | 8.1 |
| $K_2SO_4$ | 5.9 |
| $CaSO_4$ | 5.2 |
| $Al_2O_3$ | 4.5 |
| $Fe_2O_3$ | 2.1 |
| KCl | 1.4 |
| MgO | 1.3 |
| $Na_2SO_4$ | 1.3 |
| KF | 0.4 |
| Others | 0.7 |

As noted above, one particular advantage of the binder composition herein described is that this may be used without the need for any Portland cement. Binder compositions as herein described which are substantially free from (e.g. free from) Portland cement form a particularly preferred aspect of the invention.

Typically, in a composition according to the invention the GGBS and BOS components will together form the major part of the binder composition, with the inorganic waste material (i.e. BPD, CKD or mixtures thereof) forming the minor component.

All references herein to binder compositions by percent (%) or weight percent (wt. %) refer to compositions on a dry solids basis "by weight of binder" (bwob) unless otherwise indicated, i.e. by weight relative to the basic composition which is capable of forming a binder material.

Component (a), GGBS, may typically be present in an amount of at least about 30 wt. % bwob, for example at least about 35 wt. % bwob or at least about 40 wt. % bwob. Alternatively, GGBS may be present in an amount of up to about 60 wt. % bwob, for example up to about 55 wt. % bwob, up to about 50 wt. % bwob or up to about 45 wt. % bwob. Suitable amounts of GGBS for use in the binder compositions according to the invention may thus, for example, be about 30 to about 60 wt. % bwob, about 30 to about 55 wt. % bwob, about 35 to about 50 wt. % bwob, or about 35 to about 45 wt. % bwob. An amount of 35 to 45 wt. % bwob is preferred. In a preferred embodiment GGBS is present in an amount of about 40 wt. % bwob.

Component (b), BOS, may typically be present in an amount of at least about 30 wt. % bwob, for example at least about 35 wt. % bwob, at least about 40 wt. % bwob or at least about 45 wt. % bwob. Alternatively, BOS may be present in an amount of up to about 65 wt. % bwob, for example up to about 60 wt. % bwob, up to about 55 wt. % bwob, or up to about 50 wt. % bwob. Suitable amounts of BOS for use in the binder compositions according to the invention may thus, for example, be about 30 to about 65 wt. % bwob, about 30 to about 60 wt. % bwob, about 35 to about 65 wt. % bwob, about 35 to about 60 wt. % bwob, about 40 to about 60 wt. % bwob, or about 45 to about 55 wt. % bwob. 45 to 55 wt. % bwob is preferred. In a preferred embodiment BOS is present in an amount of about 50 wt. % bwob.

Component (c), the alkaline inorganic waste material selected from by-pass dust (BPD), cement kiln dust (CKD) and mixtures thereof, may typically be present in an amount of at least about 3 wt. % bwob, for example at least about 3.5 wt. % bwob, at least about 4 wt. % bwob, or at least about 4.5 wt. % bwob. Alternatively, component (c) may be present in an amount of up to about 12 wt. % bwob, for example up to about 11.5 wt. % bwob, up to about 11 wt. % bwob, or up to about 10.5 wt. % bwob. Suitable amounts of component (c) for use in the binder compositions according to the invention may thus, for example, be about 3 to about 12 wt. % bwob, about 3.5 to about 11.5 wt. % bwob, about 3.5 to about 11 wt. % bwob, about 3.5 to about 10.5 wt. % bwob, about 4 to about 11.5 wt. % bwob, about 4 to about 11 wt. % bwob, about 4 to about 10.5 wt. % bwob, or about 4.5 to about 10.5 wt. % bwob. Particularly preferred ranges are about 4 to about 6 wt. % bwob and about 9 to about 11 wt. % bwob. In a preferred embodiment component (c) is present in an amount of about 5 wt. % bwob or about 10 wt. % bwob.

BPD is particularly preferred for use as component (c). Where mixtures of BPD and CKD are used, these will generally comprise 50 wt. % or greater BPD as a proportion of the BPD/CKD mixture.

Components (a), (b) and (c) may be present together in the compositions of the invention in any combination of the amounts given above. In a preferred embodiment, the invention provides a binder composition which is preferably free from Portland cement, and which comprises:
 (a) GGBS in an amount of about 30 to about 60 wt. % bwob,
 (b) BOS in an amount of about 30 to about 65 wt. % bwob,
 (c) BPD in an amount of about 3 to 12 wt. % bwob.

In such an embodiment the amounts of components (a), (b) and (c) may be chosen independently from the various ranges recited above, provided that the total wt. % bwob of the components does not exceed 100 wt. % bwob.

In a particularly preferred embodiment, the invention provides a binder composition which comprises GGBS in an amount of about 40 wt. % bwob, BOS in an amount of about 50 wt. % bwob, and BPD in an amount of about 10 wt. % bwob.

Methods of making the binder compositions herein described form a further aspect of the invention. Such methods comprise the step of admixing the various components of the composition (in dry form) in the defined ranges. If appropriate, prior to admixing, the BOS component of the binder may be milled, e.g. using a ball mill, and passed through a sieve in order to improve the degree of homogeneity of particle sizes. Mixing of the various components may be performed manually, mechanically (e.g. employing a pan mixer), or using a combination of manual and mechanical mixing (e.g. alternating mechanical and manual mixing steps) as desired in order to reach the desired degree of homogeneity.

To form concrete, the binder compositions of the invention are mixed with water in order to undergo a hydration reaction as discussed above. This forms a paste mixture consisting of a binder composition as described herein and water. Such paste mixtures are suitably semi-dry, i.e. comprise sufficient water to allow the necessary hydration reactions to take place which lead to hardening of the binder mix but do not comprise a significant excess of water. The water-to-binder (W/B) ratio in paste mixtures is desirably from 0.1 to 0.25. Particularly preferably the W/B ratio is about 0.15.

Although paste mixtures are capable of undergoing the appropriate hydration and solidification reactions to form a solid article with good physical strength, such articles are typically unsuitable for civil engineering applications as, although strong, these do not satisfy the necessary durability requirements for practical purposes such as weathering resistance (e.g. freeze-thaw resistance and water absorption) tests. In addition to water, the binder compositions of the invention will therefore generally be mixed with other conventional concrete-forming components including aggregate and sand, which will bind with the binder to form concrete. The presence of aggregate and, optionally, sand serves to improve the weathering resistance and performance criteria of the overall composite material. Aggregate and sand also provide an increased bulk to the material. Collectively, aggregate and sand may be referred to herein as "stones". Ideally such concrete mixtures exclude Portland cement.

Optionally, the binder may be provided to customers, such as factories, as a pre-blended mixture ready to be mixed with other concrete-forming components. The pre-blended binder can thus be stored in the factory in one silo rather than requiring multiple silos to house separately the individual components of the binder.

Use of a composition as described herein as a binder in a concrete mix forms a further aspect of the invention.

All references herein to concrete mixes by percent (%) or weight percent (wt. %) refer to compositions on a dry solids basis unless otherwise indicated. Such references to percent (%) or weight percent (wt. %) content should not be confused with references to the composition by weight of binder (bwob) which is used to refer to the composition of the binder. Thus, for example, a binder composition comprising components totaling 100 wt. % bwob may itself form less than 100 wt. % of an overall concrete mix.

In a further aspect the invention provides a concrete mix comprising:
 (i) a binder composition as herein described;
 (ii) aggregate;
 (iii) sand; and optionally
 (iv) fibres.

In the concrete mixes of the invention, component (i), the binder, may typically be present in an amount of about 5 to about 30 wt. % of the composition, for example about 5 to about 9 wt. %, or about 12 to about 16 wt. %. It is especially preferred that component (i) is present in an amount of about 25 to about 30 wt %. In a particularly preferred embodiment component (i) is present in an amount of about 28 wt. %.

Component (ii), aggregate, may typically be present in an amount of from about 40 to about 65 wt. %. Preferably this is present in an amount of from about 45 to about 55 wt. %. In a particularly preferred embodiment component (ii) is present in an amount of about 50 wt. %.

Component (iii), sand, may typically be present in an amount of from about 15 to about 25 wt. %. In a particularly preferred embodiment component (iii) is present in an amount of about 20 wt. %.

It is preferred that the concrete mixes herein described will be substantially free from (e.g. free from) Portland cement.

Optionally the concrete mix may additionally comprise, as component (iv), fibres in order to provide superior resistance to cracking in hardened state concrete as well as maximum resistance to damage from heavy impact and dynamic loading. Additional positive features and benefits provided by the inclusion of fibres include increased flexural toughness/residual strength, better post-crack performance and increased impact and abrasion resistance. In the absence of fibres, such properties may be attained by varying (e.g. increasing) the proportions of binder, sand and/or aggregate in the concrete mix as appropriate to produce the desired result. Appropriate proportions would be readily determined by those skilled in the art. However, the use of fibres provides a more economical means of achieving this goal due to the lower cost of fibre compared to binder materials and aggregate.

Preferably the fibres used in the concrete mixes of the invention are metallic fibres. Particularly preferably the fibres are steel fibres. Carbon fibres may also be used and provide a similar tensile strength to steel fibres.

Suitably the fibres may have a length of about 35 mm and a diameter of about 0.55 mm. Preferably the tensile strength of the fibres is about 1250 N/mm$^2$. Optionally the fibres may have hooked ends to improve the bonding of the fibres with the concrete matrix, although unhooked (straight-cut) fibres can also be used.

Where present, the fibres may typically be present in an amount of about 1 to about 2 wt. %. Preferably these are present in an amount of about 1.5 wt. %.

Components (i)-(iii) and, where present, any fibres (iv), may be present together in the concrete mixes of the invention in any suitable combination of amounts to provide a composition with the desired properties when set. The amounts of these components may thus be chosen independently from the various ranges recited above, provided that the total wt. % of components (i)-(iii) does not exceed 100 wt. %.

In the specific context of fibres, the wt. % of fibres is calculated separately from the wt. % of components (i)-(iii). Components (i)-(iii) together may total, but not exceed, 100 wt. %, as described above. The fibre content is then calculated as an (additional) wt. % of the combined weight of components (i)-(iii) and, where present, any other non-fibre components.

In a preferred embodiment, the invention provides a concrete mix comprising component (i) in an amount of about 28 wt. %, component (ii) in an amount of about 52 wt. %, component (iii) in an amount of about 20 wt. % and component (iv) (fibres) in an amount of about 1.5 wt. %, preferably wherein the concrete mix is free of Portland cement.

In an especially preferred embodiment the invention provides a concrete mix comprising
  (i) a binder composition as herein described in an amount of about 28 wt. %
  (ii) aggregate in an amount of about 52 wt. %;
  (iii) sand in an amount of about 20 wt. %;
  (iv) fibres in an amount of about 1.5 wt. %;
wherein component (i) consists of
  (a) GGBS in an amount of 40 wt. % bwob,
  (b) BOS in an amount of 50 wt. % bwob, and
  (c) BPD in an amount of 10 wt. % bwob.

Methods of making a concrete mix as herein described also form part of the invention. Viewed from a further aspect the present invention thus provides a method of manufacturing a concrete mix, said method comprising the step admixing fine and coarse aggregates, and optionally sand, together with a binder composition as herein defined. The method may further include admixing of fibres. Mixing of the various components may be performed manually, mechanically (e.g. employing a pan mixer), or using a combination of manual and mechanical mixing (e.g. alternating mechanical and manual mixing steps) as desired in order to reach the desired degree of homogeneity.

The aggregate used in the concrete mixes of the invention preferably comprises or consists of natural crushed quartz particles. Advantageously the aggregate comprises a blend of particles having different particle sizes in order to promote efficient "packing" or space-filling. More efficient packing will generally allow for the production of a stronger material, although as the packing efficiency increases the volume of "void space" available for the binder to occupy decreases. There is therefore a balance to be struck between achieving maximum packing efficiency and maintaining a sufficient amount of void space to allow the binder to permeate throughout the aggregate and efficiently bind the aggregate particles together. Appropriate selection of the balance of different particle sizes thus allows for an optimal balance to be achieved between high-density packing of material and the provision of void space for the binder to occupy.

Preferably the aggregate comprises (e.g. consists essentially of) a blend of fine and coarse particles. In an embodiment the aggregate consists of a blend of fine and coarse crushed quartz particles.

The sizes of fine and coarse particles, and the ratio of fine:coarse particles, may vary depending on the intended purpose of the finished concrete article. The particle size may suitably be determined by gradation testing. Gradation testing, also known as sieve analysis, is a common procedure used to assess the particle size distribution (gradation) of a granular material and is commonly carried out according to ASTM standard C136-06 or BS EN 12620:2002. In the context of paving blocks, "fine particles" are normally those having a maximum diameter of about 4 mm and "coarse particles" are normally those having a maximum diameter of about 6-10 mm.

As described above, the ratio of fine to coarse particles should be chosen to achieve optimal packing. In the case of fine particles having a maximum diameter of 4 mm and coarse particles having a maximum diameter of 6 mm the ratio of fine to coarse particles will typically be in the range 5:1 to 6:1. As would be recognised by the person having ordinary skill in the art, a range of alternative particle sizes and ratios of fine to coarse particles may be appropriate depending on the intended properties and purpose of the finished concrete article. Variation in the sizes and ratio of aggregate particles may also necessitate modification of the relative proportions of other components in the concrete mix in order to maintain a given set of physical characteristics. Determination of the appropriate combinations of particle sizes, ratios, and proportions of other components in the concrete mix would be a matter of routine for the skilled person.

Thus in a preferred embodiment the aggregate used in the concrete mixes of the invention comprises or consists of a blend of fine aggregate particles having a maximum size of about 4 mm and coarse aggregate particles having a maximum size of about 6-10 mm. In a particularly preferred embodiment the aggregate comprises or consists of a blend of fine aggregate particles having a maximum size of about 4 mm and coarse aggregate particles having a maximum size of about 6 mm, wherein the aggregate particles are natural crushed quartz aggregates and the ratio of fine to coarse particles is from 5:1 to 6:1.

In order to form a concrete article, the concrete mixes of the invention are mixed with water in order to undergo a hydration reaction as discussed above. Suitably the pozzolanic reaction which results in the formation of a hardened concrete article may be achieved by mixing a concrete mix according to the invention with water to form a semi-dry composition. As described above, by "semi-dry" is meant that water is added in an amount such that this comprises a water-to-binder (W/B) ratio of 0.1 to 0.25. It is particularly preferred that the W/B ratio is 0.15.

Thus viewed from a further aspect the invention provides a semi-dry composition comprising a concrete mix as described herein in combination with water.

Optionally the semi-dry composition may additionally comprise chemical admixtures in the form of powders or fluids which further modify the characteristics of the concrete, for example to accelerate or retard the rate of hydration, alter the colour for aesthetic reasons, or increase the plasticity (workability) of the concrete prior to solidification. Conventional classes of admixture may be used alone or in combination, including accelerators, retarders, air entrainments, plasticizers, pigments, corrosion inhibitors, bonding agents, pumping aids, etc. Where present, admixtures are normally provided up to a maximum of 5 wt. % of the overall semi-dry composition (calculated in the same manner as the wt. % of fibres as described above).

Preferably, however, the semi-dry compositions of the invention do not include admixtures and consist essentially of a concrete mix as described above (optionally including fibres) in combination with water. Alternatively the semi-dry compositions of the invention may consist essentially of a concrete mix as described above (optionally including fibres) in combination with water and at least one pigment.

Upon the mixing of water with a concrete mix according to the invention, the composition will undergo a spontaneous and exothermic reaction which results in the formation of a hardened concrete article. Thus viewed from a further aspect the invention provides the use of a binder composition, concrete mix or semi-dry composition as described herein in the manufacture of a concrete article. Concrete articles formed from a binder composition, concrete mix or semi-dry composition as herein described form a further aspect of the invention.

Concrete articles according to the invention may consist of a single layer or may comprise a plurality of layers. Preferably adjacent layers are formed from concrete mixes of differing composition.

Thus viewed from a further aspect the invention provides a concrete article formed from a binder composition, concrete mix or semi-dry composition as herein described, said concrete article comprising a plurality of layers wherein adjacent layers differ in composition. In a preferred embodiment the concrete articles may comprise a lower layer without added pigment and an upper layer which comprises at least one pigment. Such articles provide an improved aesthetic appearance on a surface of the article which is intended to be exposed to view, while reducing the amount of pigment needed to achieve the improved appearance. A particularly preferred concrete article of the invention is a paving block, especially a multi-layered paving block.

Where paving blocks according to the invention are formed from concrete mixes comprising fibres, it is preferred that the paving block comprises an upper layer which is free of fibres and a lower layer which comprises fibres. This prevents fibres becoming exposed over time (for example due to damage such as weathering or abrasion) where they could otherwise pose a safety hazard. Typically the upper layer will have a depth of at least 5 mm, e.g. about 10 mm.

Preferably the multi-layered concrete paving block comprises an upper layer which is free of fibres and which comprises a pigment, and a lower pigment-free layer which comprises fibres.

For use in the United Kingdom, paving blocks must meet certain minimum standards as set out in BS EN 1338:2003 with regard to strength, resistance to weathering and water absorption, and slip/skid characteristics. A minimum tensile strength of 3.6 MPa is specified by the BS EN1338:2003 standard for paving blocks. The potential for slip should be classified as "satisfactory", which requires a slip/skid resistance of at least 40 BPN (British Pendulum Numbers). The water absorption test should show a result of less than 6%. Freeze/thaw testing should produce a result of <1.0 kg/m$^2$ (measured as the amount of material lost due to scaling of the surface when subjected to freeze-thaw cycles). Details of the testing procedures are described in the Examples and may also be found in the documentation for the British Standard referred to herein. Where appropriate, by routine optimisation the relative amounts of any of the components of the compositions herein described may be varied in order to meet these requirements.

In a further aspect the invention provides a paving block formed with a binder composition as herein described, said paving block having at least one of the following properties as determined according to BS EN 1338:2003:
 (i) a minimum tensile strength of 3.6 MPa;
 (ii) water absorption of less than 6%;
 (iii) freeze-thaw resistance of <1.0 Kg/m$^2$; and
 (iv) a slip/skid resistance of at least 40 BPN.

Paving blocks having at least two of the above properties, e.g. all of such properties, form a preferred embodiment of the invention.

Methods for making any of the concrete articles herein described also form part of the invention. Viewed from a still further aspect the invention thus provides a method of manufacturing a concrete article, preferably a paving block, said method comprising the steps of:
 (i) preparing a concrete mix as defined herein; and
 (ii) mixing said concrete mix with water whereby to form a semi-dry composition as described herein; and optionally
 (iii) casting the semi-dry composition into a mould having a desired shape.

Preferably, following casting of the semi-dry composition into the mould, the composition is compressed, e.g. using a compression machine, in order to fully compact the materials. Suitable loads are, for example, 150 kN for the production of a paste (water+binder only) or 400 kN for the production of concrete. Suitable compression/casting methods and conditions are well-known to the skilled person and may be carried out using standard factory equipment such as paving machines and high-frequency vibrating tables as long as these are able to achieve the high level of compaction and uniformity of strength required. Typically hydraulic compaction pressures of at least 5.5 MPa and high-intensity vibration of 3000 vibrations per minute (VPM) are desired.

When producing a multi-layered concrete article, two or more different semi-dry compositions may be prepared separately. These are then poured one after the other into the same mould. Compaction is typically carried out following pouring of the final layer. In this way a multi-layered concrete article having two or more layers of differing composition may be formed.

Thus viewed from a further aspect the invention provides a method of manufacturing a multi-layered concrete article, preferably a paving block, said method comprising the steps of:

(i) preparing a first concrete mix as defined herein; and
(ii) mixing said first concrete mix with water whereby to form a first semi-dry composition as described herein;
(iii) pouring the first semi-dry composition into a mould having a desired shape;
(iv) preparing a second concrete mix as described herein, wherein the composition of said second concrete mix is different from the first concrete mix;
(v) adding water to said second concrete mix whereby to form a second semi-dry composition; and
(vi) pouring the second semi-dry composition into the mould whereby to form a layer on top of the first semi-dry composition.

Steps (iv)-(vi) may be repeated as necessary to produce a concrete article having any desired number of layers, for example three or more layers.

Suitable mixing, pouring and casting methods will be well-known to the skilled person. The binders and concrete mixes of the present invention may suitably be mixed, poured and cast according to the same conventional factory techniques which are usually employed for the production of Portland cement-containing compositions.

In the context of the laboratory-scale methods described in the Examples below, following casting, the materials are preferably covered with a waterproof (e.g. polythene) sheet or cured in curing chambers to prevent loss of water then left overnight. The materials are then de-moulded and preferably stored in curing chambers at a constant air temperature of about 22° C.±2° C. and relative humidity of about 95% until needed. In factory production, the mould will generally be removed immediately after casting and compaction (e.g. vibro-pressing).

BRIEF DESCRIPTION OF DRAWINGS

The invention will now be illustrated further with reference to the following non-limiting Examples and the accompanying Figures in which.

In the Examples the following acronyms and abbreviations are employed:

| | |
|---|---|
| Ordinary Portland Cement | OPC |
| Basic Oxygen Slag | BOS |
| Ground Granulated Blast Furnace Slag | GGBS |
| Cement Bypass Dust | BPD |
| Pulverised Fuel Ash | PFA |
| Steel Fibre | SF |
| Loss on Ignition | LoI |
| British Pendulum Number | BPN |
| Run Of Station Ash | ROSA |

The ground granulated blast furnace slag (GGBS) was obtained from Civil and Marine, a part of Hanson UK. The material was marketed under the BS EN 15167-1:2006 standard and had a specific gravity of 2.9.

Figure 1:
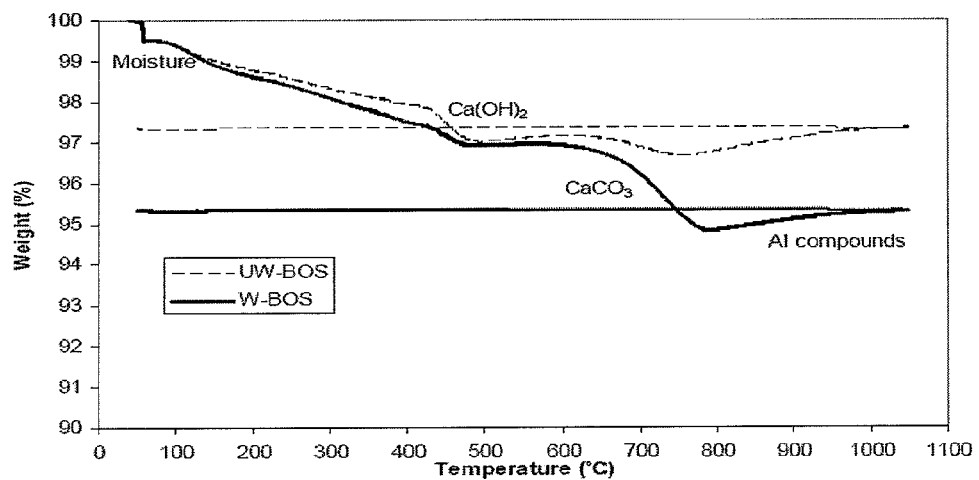
FIG. 1 shows thermogravimetric (TGA) analysis results for un-weathered basic oxygen slag (UW-BOS) and weathered basic oxygen slag (W-BOS)

The basic oxygen slag was acquired from Tarmac UK from the Corus-Tata plant at Scunthorpe. This was milled using a laboratory ball mill, and passed through a 600 μm sieve before being added to the mixes. The average particle size of BOS slag used was 40-60 μm as determined by a Malvern Mastersize 2000 laser analyser with an accuracy of ±1%. FIG. 1 shows the results of thermogravimetric analysis (TGA) of weathered and unweathered BOS as determined by a Perkin Elmer Pyris 1 thermogravimetric analyser. Weathered BOS is not freshly produced, but rather is taken from the stock pile and hence tends to be more carbonated, i.e. it has less free lime than unweathered BOS.

Figure 2:
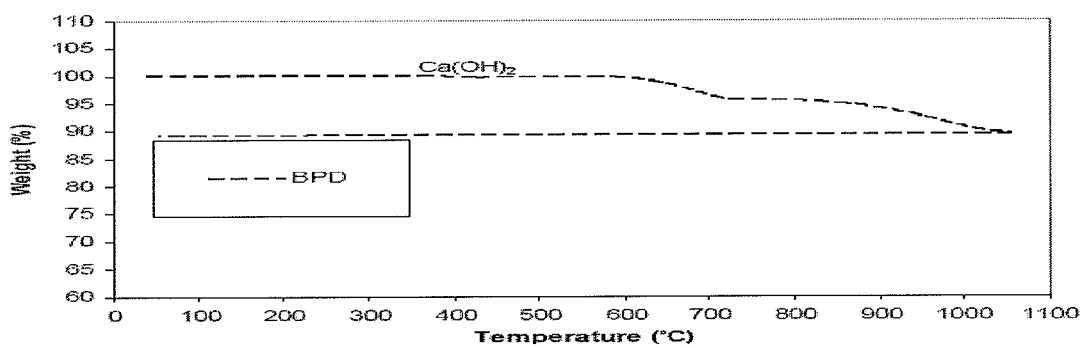
FIG. 2 shows TGA analysis results for cement bypass dust (BPD)

BPD from a local cement works, Castle Cement (Heidelberg cement group, Rugby, UK), was obtained. The BPD was provided in a powder form. The average size of fine particles was about 10 μm for the BPD, and the maximum particle size was 200 μm. The TGA results are shown in FIG. 2.

Steel wire fibre with hooked ends 35 mm in length and 0.55 mm in diameter with tensile strength of about 1250 N/mm$^2$ was obtained from KrampeHarex.

The aggregates used in the Examples originated from two sources. The natural sand used has a density of 2.6 g/cm$^3$ as determined using a helium pycnometer. Two different maximum sizes, 4 mm and 6 mm, of natural crushed quartz aggregates were used.

Figure 3:
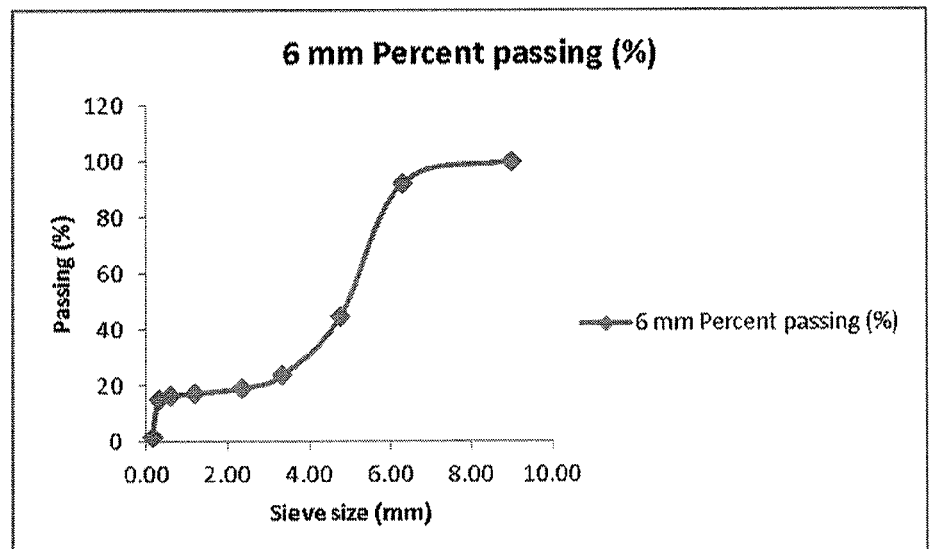
FIG. 3 shows a sieve analysis of 6 mm aggregates.
Figure 4:
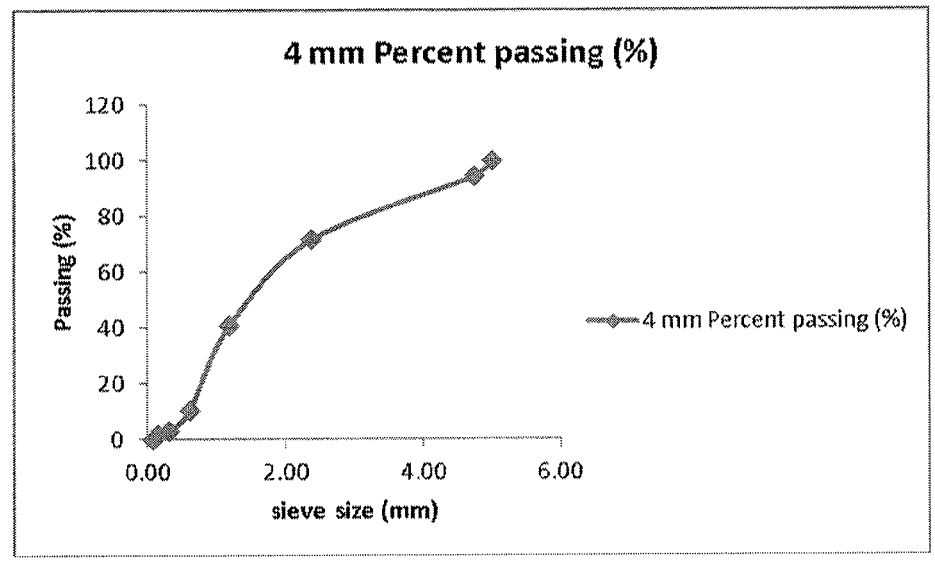
FIG. 4 shows a sieve analysis of 4 mm aggregates.

Tables 2 and 3 and FIGS. 3 and 4 show the results of sieve analysis of the aggregates used. These aggregates comply with BS 882:1992 and BS EN 12620:2002.

TABLE 2

Aggregate grading of 6 mm used for concrete paving blocks

| Sieve size (mm) | Retained weight (g) | passing weight (g) | Percent passing (%) |
|---|---|---|---|
| 9.0 | 0 | 2000 | 100 |
| 6.3 | 157.8 | 1842.2 | 92.11 |
| 6.0 | 730.9 | 1111.3 | 55.57 |
| 5.0 | 43.1 | 1068.2 | 53.41 |
| 4.75 | 175.9 | 892.3 | 44.62 |
| 4.0 | 284.5 | 607.8 | 30.39 |
| 3.35 | 129.9 | 477.9 | 23.89 |
| 2.8 | 71.6 | 406.3 | 20.32 |
| 2.36 | 24.3 | 382 | 19.1 |
| 1.18 | 37.3 | 344.7 | 17.24 |
| 600 | 13.5 | 331.2 | 16.56 |
| 300 | 29.5 | 301.7 | 15.09 |
| 150 | 268.3 | 33.4 | 1.67 |
| 75 | 22.9 | 10.5 | 0.53 |
| <75 | 10.5 | — | — |
| Total weight | 2000 | | |

TABLE 3

Aggregate grading of 4 mm used for concrete paving blocks

| Sieve size (mm) | Retained weight (g) | passing weight (g) | Percent passing (%) |
|---|---|---|---|
| 5.00 | 0 | 2000 | 100 |
| 4.75 | 119.3 | 1880.7 | 94.04 |
| 4.0 | 94.7 | 1786 | 89.3 |
| 3.35 | 92.2 | 1693.8 | 84.69 |
| 2.8 | 142.7 | 1551.1 | 77.56 |
| 2.36 | 122.5 | 1428.6 | 71.43 |
| 1.18 | 615.0 | 813.6 | 40.68 |
| 600 | 610.5 | 203.1 | 10.16 |
| 300 | 141.8 | 61.3 | 3.07 |
| 150 | 28.3 | 33 | 1.65 |
| 75 | 24.4 | 8.6 | 0.43 |
| <75 | 8.6 | — | — |
| Total weight | 2000 | | |

EXAMPLE 1

Comparison of Laboratory Compaction Simulation with Factory Methods Using Conventional Portland Cement-Containing Paving Block Mixtures Conventional Portland cement-containing mixtures were prepared and subjected to a number of different methods of compaction. This was carried out to optimise the compaction methods to be used in laboratory testing of the compositions of the invention.

The optimal method of compaction examined was a pressing action method making use of a compression machine. In this technique, different magnitudes of loads were applied to determine the best results in order to obtain consistent density and optimum flexural strength results. The materials were compacted in one layer. A mould collar was also used to retain the material within the mould.

Figure 5:
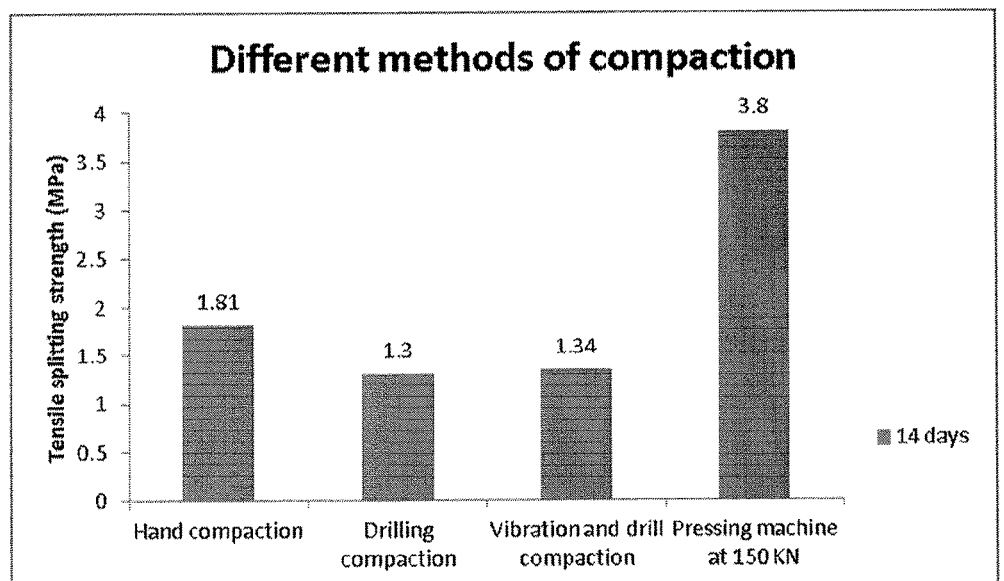
FIG. 5 shows the results of a splitting tensile strength test (in MPa) on OPC-GGBS-BOS mixtures according to the invention carried out after 14 days using different methods of compaction.
Figure 6:
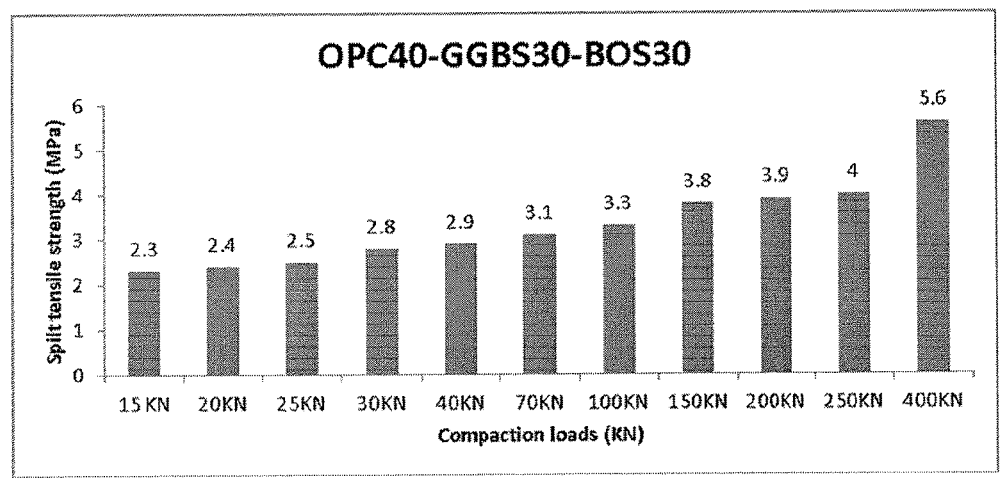
FIG. 6 shows the results of a splitting tensile strength test (in MPa) on OPC-GGBS-BOS mixtures according to the invention carried out after 14 days using different pressing loads (in kN)

FIG. 5 shows that the pressing action gives the highest splitting tensile strength for the paste compared to other methods (rammer application, hammer drill compaction, and compaction with a drill hammer and vibrating table). FIG. 6 shows the effect of different compaction loadings on the tensile strength of the paste.

Table 4 shows the results obtained for tensile strength of paste mixtures (averaged over three specimens) using various compaction loadings.

The results indicated that loadings over 70 kN gave more consistent results than lower loadings. As expected, 400 kN gave the highest strength. 150 kN was found to be practical, as bracing of the mould was not needed. A 400 kN load was found to provide comparable strength values to factory-produced specimens, but required more bracing of the moulds to avoid buckling. Loadings of more than 400 kN were not required since similar density results to factory-produced paving blocks were obtained and the bracing of the moulds would have proved difficult. Another concern for higher than 400 kN compaction loadings was the crushing of the aggregates in concrete paving blocks.

150 and 400 kN loadings were therefore adopted, respectively, for casting of the experiments for paste and concrete paving blocks using the Portland cement-free compositions of the invention.

EXAMPLE 2

Comparison of Factory-Made and Laboratory-Made Blocks Including Portland Cement

A mix design obtained from a paving block manufacturer is given in Table 5 below. The materials used by the factory were also obtained and used in the laboratory to cast the replicated mix design from the factory and compare the results.

TABLE 5

Two mix designs of paving blocks used by a factory (percentage by weight)

| Colour | Portland Cement | GGBS | 4 mm - Dust | 6 mm Clean | Sand |
|---|---|---|---|---|---|
| Natural | 10% | 4% | 53% | 9% | 24% |

| Colour | Portland Cement | PFA | 4 mm - Dust | 6 mm Clean | Sand |
|---|---|---|---|---|---|
| Charcoal | 10% | 4% | 53% | 9% | 24% |

The results of the two different factory designed mixes cast and tested in the laboratory are given in Tables 6 and 7. The compaction loading of 400 kN was used in the laboratory for these mixes. The results indicate 28 days tensile strength of 3.2 and 2.6 MPa respectively for their GGBS and PFA mixes which includes the traditional 10 percent cement by weight.

It is remarkable that the factory blocks of GGBS mix which were brought to the laboratory also gave an average tensile strength of 3.2 MPa. This implies that the laboratory compaction method of 400 kN for concrete blocks gives an

TABLE 4

Pressing action technique results (using compression machine).

| Code name | | | | Type | Age (days) | Load (kN) | Average weight (g) | Average failure load (kN) | Average density (Kg/m$^3$) | Average tensile strength (MPa) |
|---|---|---|---|---|---|---|---|---|---|---|
| | OPC-GGBS-BOS | | | Block | 14 | 15 | 2673.4 | 53.20 | 1833 | 2.3 |
| OPC | GGBS | BOS | Water | | | 20 | 2737.2 | 55.52 | 1877 | 2.4 |
| 40% | 30% | 30% | 15% | | | 25 | 2730.4 | 57.83 | 1872 | 2.5 |
| 3.6 | 2.7 | 2.7 | 1.35 | | | 30 | 2911.2 | 64.77 | 1996 | 2.8 |
| (kg) | (kg) | (kg) | (L) | | | 40 | 2930.7 | 67.08 | 2010 | 2.9 |
| | | | | | | 70 | 2975.2 | 71.71 | 2030 | 3.1 |
| | | | | | | 100 | 3138.0 | 76.33 | 2009 | 3.3 |
| | | | | | | 150 | 3174.5 | 87.89 | 2162 | 3.8 |
| | | | | | | 200 | 3173.4 | 90.21 | 2176 | 3.9 |
| | | | | | | 250 | 3270.3 | 92.53 | 2242 | 4.0 |
| | | | | | | 400 | 3261.5 | 129.54 | 2236 | 5.6 | exact match with the factory compaction method. It is noteworthy that a minimum tensile strength of 3.6 MPa is specified by the BS EN1338: 2003 standard for paving blocks to be acceptable for consumers. For this reason all the blocks were cast in the laboratory to ensure satisfaction of standard requirements.

TABLE 6

Factory mixture design with GGBS showing compressive and tensile splitting strength results at 14 and 28 days carried in the laboratory.

| Cement | GGBS | 4 mm-Dust | 6 mm Clean | Sand |
|---|---|---|---|---|
| 10% | 4% | 53% | 9% | 24% |

| | No | Age (days) | Mass (g) | Failure load (kN) | Density (kg/m$^3$) | 50 mm cubes compressive strength (N/mm$^2$) | Mean compressive strength (N/mm$^2$) |
|---|---|---|---|---|---|---|---|
| Cubes | 1 | 14 | 274.0 | 30.8 | 2192.0 | 12.3 | 11.7 |
| | 2 | | 273.5 | 29.7 | 2188.0 | 11.9 | |
| | 3 | | 273.5 | 28.5 | 2188.0 | 11.4 | |
| | 4 | | 273.0 | 27.2 | 2184.0 | 10.9 | |
| | 1 | 28 | 290.5 | 45.1 | 2324.0 | 18.0 | 18.6 |
| | 2 | | 291.0 | 46.3 | 2328.0 | 18.5 | |
| | 3 | | 291.5 | 47.5 | 2332.0 | 19.0 | |
| | 4 | | 290.0 | 40.9 | 2320.0 | 16.4 | |
| | 5 | | 292.0 | 47.5 | 2336.0 | 19.0 | |

| | No | Time (days) | Mass (g) | Failure load (kN) | Failure length (mm) | Failure thickness (mm) | Density (kg/m$^3$) | 190 × 100 × 76 mm tensile Splitting strength (N/mm$^2$) | Mean tensile Splitting strength (N/mm$^2$) |
|---|---|---|---|---|---|---|---|---|---|
| BLOCKs | 1 | 14 | 3467.0 | 47.3 | 190 | 76 | 2377.2 | 2.1 | 2.0 |
| | 2 | | 3466.5 | 45.7 | 190 | 76 | 2376.9 | 1.9 | |
| | 3 | | 3465.5 | 43.9 | 190 | 76 | 2376.2 | 1.9 | |
| | 1 | 28 | 3477.0 | 74.6 | 190 | 76 | 2384.1 | 3.2 | 3.2 |
| | 2 | | 3484.5 | 75.9 | 190 | 76 | 2389.2 | 3.3 | |
| | 3 | | 3474.0 | 72.4 | 190 | 76 | 2381.9 | 3.1 | |
| | 4 | | 3470.5 | 70.1 | 190 | 76 | 2379.6 | 3.0 | |
| | 5 | | 3474.5 | 73.2 | 190 | 76 | 2382.3 | 3.2 | |

TABLE 7

Factory mixture design with PFA showing compressive and tensile splitting strength results at 14 and 28 days carried in the laboratory.

| Cement | PFA | 4 mm-Dust | 6 mm Clean | Sand |
|---|---|---|---|---|
| 10% | 4% | 53% | 9% | 24% |

| | No | Age (days) | Mass (g) | Failure load (kN) | Density (kg/m$^3$) | 50 mm cubes Compressive strength (N/mm$^2$) | Mean Compressive strength (N/mm$^2$) |
|---|---|---|---|---|---|---|---|
| Cubes | 1 | 14 | 283.5 | 30.2 | 2268.0 | 12.1 | 12.9 |
| | 2 | | 285.0 | 32.8 | 2280.0 | 131 | |
| | 3 | | 284.5 | 31.6 | 2276.0 | 12.6 | |
| | 1 | 28 | 290.5 | 42.3 | 2324.0 | 16.9 | 15.7 |
| | 2 | | 289.0 | 38.8 | 2312.0 | 15.5 | |
| | 3 | | 289.5 | 39.5 | 2316.0 | 15.8 | |

| | No | Time (days) | Mass (g) | Failure load (kN) | Failure length (mm) | Failure thickness (mm) | Density (kg/m$^3$) | 190 × 100 × 76 m Tensile Splitting strength (N/mm$^2$) | Mean Tensile Splitting strength (N/mm$^2$) |
|---|---|---|---|---|---|---|---|---|---|
| BLOCKs | 1 | 14 | 3479.0 | 44.7 | 190 | 76 | 2385.4 | 1.9 | 2.0 |
| | 2 | | 3480.5 | 46.9 | 190 | 76 | 2386.5 | 2.0 | |
| | 3 | | 3487.5 | 48.7 | 190 | 76 | 2391.3 | 2.1 | |
| | 1 | 28 | 3493.0 | 58.4 | 190 | 76 | 2395.0 | 2.5 | 2.6 |
| | 2 | | 3493.5 | 60.3 | 190 | 76 | 2395.4 | 2.6 | |
| | 3 | | 3519.0 | 62.3 | 190 | 76 | 2412.8 | 2.7 | |
| | 4 | | 3495.0 | 60.6 | 190 | 76 | 2396.4 | 2.6 | |
| | 5 | | 3501.0 | 61.8 | 190 | 76 | 2400.5 | 2.7 | |

EXAMPLE 3

Portland Cement-Free Binder and Paste Compositions

Materials and Methods

Mixing and Casting Methods:

All mixtures were mechanically mixed in a pan mixer to produce a uniform distribution of the materials. Steel paving block moulds of 190 mm in length, 100 mm in width and 76 mm in depth were used for the casting of paving blocks. A compression machine was used to fully compact the materials in one layer with 150 kN of load for pastes and 400 kN for concrete.

Paste and Concrete Mixture:

A Hobart mixer machine was used for all paste mixes. The mixing technique adopted for paste was as follows:

The dry materials were mixed using a mechanical pan mixer for 2 minutes. Then the paste was hand mixed to ensure the materials in the bottom of the bowl were mixed thoroughly.

The dry materials were mixed again for another 2 minutes.

Water was then added and the paste was mixed for another 2 minutes, at medium and high speed.

The mixing for concrete was carried out according to standard procedures followed in factory production of concrete paving blocks. A pan mixer of about 15 liter capacity was used to make the concrete mixes. This mixing procedure was as follows:

The fine and coarse aggregates were measured in the designed proportions (see Tables 10 and 19) and poured into the pan mixer. They were then mixed dry for 45 seconds.

The BOS, BPD, and GGBS were measured, poured in the mixer and mixed dry for 45 seconds.

Half the water needed for the mix was added and the mixing continued for another 1 minute.

The mixer was stopped and mixture scrapped off the corners and bottom of the pan and blades.

The remainder of the water was added and mixing was carried out for another 2 minutes.

When steel fibres were added, these were added (as applicable) and mixed properly after the aggregates had been mixed properly with the cementitious material.

Casting and Curing:

The materials were cast in pre-oiled blocks and cube moulds by a compression machine. Once cast, the specimens were covered with a polythene sheet so that there would be no loss of water. On the next day all samples were de-moulded and then stored in curing chambers at a constant air temperature of 22±2° C. and 98% relative humidity until they were to be tested.

Test Methods

Compressive Strength:

The compressive strength of the cubes and paving block specimens can be defined as the measured maximum resistance of a concrete to axial loading. This test was carried out at 14 and 28 days of age for each specimen and then the density was determined. The compressive strength of the specimens was determined using the Avery-Denison compression testing machine with a maximum capacity load of 2000 kN, according to standard methods as described in BS EN 12390-3:2009. For the 50×50 mm cubes, the compression load was applied to the smooth face The compressive strength of the cubes were determined by dividing the maximum load by the load area of the specimen.

Splitting Tensile Strength Test:

BS EN 1338: 2003 was used to determine the tensile splitting strength of the paving blocks and the load was applied along the longest splitting section of the specimen block. Prior to the test, the block specimen was located in the split tensile steel frame, using wood pieces on the top and bottom of the specimen to provide packing.

In this test the block samples were immersed in water at 20±5° C. for 24 hours after which they were removed, wiped dry and the tests were carried out immediately. Contact was made between the plates of the loading machine and the top and bottom of the steel plates of the testing frame, before the load was slowly applied at a rate of (0.05±0.01) MPa/s until the point of failure, at which point the test was brought to an end and the specimen was divided into two halves. A record was made of the failure load and the tensile splitting stress was calculated in MPa according to BS EN1338: 2003 as given below:

Splitting strength=0.637×failure load×
thickness factor/(failure length×
failure thickness)

The mean strength must be at least 3.6 N/mm² with no individual result below 2.9 N/mm².

TABLE 8

Factors given in BSEN1338 standard

| Thickness | Factor |
| --- | --- |
| 50 mm | 0.79 |
| 60 mm | 0.87 |
| 70 mm | 0.94 |
| 80 mm | 1 |
| 100 mm | 1.11 |

A minimum tensile strength of 3.6 MPa is specified to be obtained by the standard for paving blocks in order to be acceptable by the industry. The compressive strength of the cubes is defined as measured maximum resistance of a concrete to uni-axial loading. Blocks and cubes were tested at 14 and 28 days of age for comparison purposes only.

Slip/Skid Resistance:

The likelihood of pedestrians slipping and vehicles skidding is measured by determining its slip/skid resistance. In order to measure unpolished slip resistance use is made of a 'standard rubber' material which is attached to a Pendulum Friction Tester; this is then tested under wet conditions. BS EN 1338: 2003 Annex I was used to find the unpolished slip resistance value. Concrete paving blocks have satisfactory slip/skid resistance provided that their whole upper surface has not been ground and/or polished to produce a very smooth surface. This test is able to measure a block paving's slip resistance under laboratory conditions subsequent to be subjected to simulated traffic loadings. This is in order to reproduce the condition that paving blocks will perform under traffic conditions.

The test was carried out as follows:

The friction test equipment was kept in a room at a temperature of 20±2° C. for 30 minutes before the test.

The block samples were immersed in water at 20±2° C. 30 minutes before the test.

The friction tester was then placed on a firm level table and the levelling screws were adjusted to make sure the pendulum support column was vertical.

The test sample was then placed on the equipment with the longer dimension lying track of the pendulum and centrally placed with respect to the rubber slider.

The pendulum and the pointer were then released and the values on the pointer (measured in British Pendulum Numbers (BPN)) on the scale were recorded.

This process was repeated five times for each sample and the mean of the last three readings were recorded. The mean is the accepted value for the slip/skid resistance. BS EN 1338: 2003 Annex I gives the following slip resistance table (Table 9) as an indication of the value against the potential for slip.

TABLE 9

Pendulum test values taken from BS EN 1338: 2003 Annex I

| Pendulum test value (BPN) | Potential for slip | Description of surface |
|---|---|---|
| Below 19 | High | Dangerous |
| 20 to 39 | Moderate | Marginal |
| 40 to 74 | Low | Satisfactory |
| Above 75 | Extremely low | Excellent |

Weathering Resistance:

This is an expression of the extent to which concrete paving blocks are able to withstand weathering where particular circumstances exist, such as surfaces being frequently subjected to contact with de-icing salt when there is frost. It is possible to assess this capacity under laboratory conditions by making a measurement of the amount of spalled material accumulating on a surface when it has been subjected to repeated freezing and thawing with a de-icing salt being used. Where there has been no use of de-icing salt, measurements should be made of the porosity by measuring the block's water absorption.

The water absorption test is carried out after conditioning the test sample to 20±5° C. soaked to a constant mass and then oven dried to a constant mass. The loss in mass is expressed in percentage of the mass of the dry sample. The samples were soaked for 3 days which is the minimum period required. The water absorption $W_a$ of each sample in percentage of its mass was calculated using the equation:

$$W_a = \frac{M_1 - M_2}{M_2} \times 100\%$$

where
$M_1$ is the initial mass of the sample in grams
$M_2$ is the final mass of the sample in grams.

The water absorption value is the mean of all the values of the samples. The weathering resistance is determined by tests according to annex D of BS EN 1338 for freeze-thaw resistance or annex E of BS EN 1338 for water absorption. Both tests were carried out in this study.

Binder Mixture Designs and Characteristics:

A range of different Portland cement-free binder compositions were prepared. The paste mixtures (i.e. containing no aggregates or fibres) used are given in Table 10 together with a constant water-to-binder ratio (W/B) by weight of 0.15.

TABLE 10

Mixture design of paste

| Mix code | BOS (%) | BPD (%) | GGBS (%) | W/B |
|---|---|---|---|---|
| BOS35/BPD10/GGBS55 | 35 | 10 | 55 | 0.15 |
| BOS40/BPD5/GGBS55 | 40 | 5 | 55 | 0.15 |
| BOS45/BPD5/GGBS50 | 45 | 5 | 50 | 0.15 |
| BOS40/BPD10/GGBS50 | 40 | 10 | 50 | 0.15 |
| BOS50/BPD10/GGBS40 | 50 | 10 | 40 | 0.15 |
| BOS50/BPD5/GGBS45 | 50 | 5 | 45 | 0.15 |
| BOS55/BPD5/GGBS40 | 55 | 5 | 40 | 0.15 |
| BOS60/BPD10/GGBS30 | 60 | 10 | 30 | 0.15 |
| BOS60/BPD5/GGBS35 | 60 | 5 | 35 | 0.15 |

The chemical analyses of the materials used are given in Table 11. LoI denotes Loss on Ignition, in which a sample is ignited at a specified temperature, allowing volatile substances to escape, until its mass ceases to change.

The loss on ignition is used as a quality test and reported as part of an elemental or oxide analysis of a mineral. The volatile materials lost usually consist of "combined water" (hydrates and labile hydroxy-compounds) and carbon dioxide from carbonates.

TABLE 11

Chemical analysis of the raw materials carried out using X-ray fluorescence (XRF) techniques as described in ASTM D5381-93 (2009)

| Sample | OPC (%) | BOS (%) | ROSA (%) | PBD (%) | GGBS (%) |
|---|---|---|---|---|---|
| $SiO_2$ | 20.00 | 11.43 | 45.91 | 21.86 | 37.28 |
| $TiO_2$ | — | 0.39 | 1.41 | 0.29 | 0.58 |
| $Al_2O_3$ | 6.00 | 1.60 | 26.51 | 3.85 | 10.79 |
| $Fe_2O_3$ | 3.00 | 28.24 | 5.23 | 2.57 | 0.43 |
| MnO | — | 4.35 | 0.08 | 0.02 | 0.68 |
| MgO | 1.50 | 8.27 | 2.13 | 1.13 | 8.83 |
| CaO | 63.00 | 41.29 | 6.88 | 53.40 | 40.12 |
| $Na_2O$ | 1.00 | 0.02 | 0.61 | 0.41 | 0.27 |
| $K_2O$ | 1.00 | 0.02 | 1.35 | 3.64 | 0.37 |
| $P_2O_5$ | — | 1.48 | 0.98 | 0.08 | <0.05 |
| $SO_3$ | 2.00 | 0.44 | 1.37 | 7.10 | 0.15 |
| LoI | 0.50 | 3.12 | 7.11 | 5.64 | 1.03 |

Using the mix codes given in Table 10, density and tensile strength of the mixes are given in Table 12.

TABLE 12

Average density and tensile strength of paste paving blocks

| Mix Code | BOS (%) | BPD (%) | GGBS (%) | Average density (kg/m³) 14 days | Average density (kg/m³) 28 days | Average tensile Strength (MPa) 14 days | Average tensile Strength (MPa) 28 days |
|---|---|---|---|---|---|---|---|
| BOS35/BPD10/GGBS55 | 35 | 10 | 55 | 2119 | 2160 | 2.9 | 3.1 |
| BOS40/BPD5/GGBS55 | 40 | 5 | 55 | 2091 | 2116 | 2.6 | 3.3 |
| BOS45/BPD5/GGBS50 | 45 | 5 | 50 | 2149 | 2191 | 3.1 | 3.5 |
| BOS40/BPD10/GGBS50 | 40 | 10 | 50 | 2209 | 2283 | 3.2 | 4.5 |
| BOS50/BPD10/GGBS40 | 50 | 10 | 40 | 2248 | 2304 | 3.9 | 5.1 |
| BOS50/BPD5/GGBS45 | 50 | 5 | 45 | 2268 | 2301 | 3.0 | 3.9 |
| BOS55/BPD5/GGBS40 | 55 | 5 | 40 | 2299 | 2323 | 2.9 | 3.9 |
| BOS60/BPD10/GGBS30 | 60 | 10 | 30 | 2323 | 2360 | 3.7 | 4.4 |

TABLE 12-continued

Average density and tensile strength of paste paving blocks

| Mix Code | BOS (%) | BPD (%) | GGBS (%) | Average density (kg/m$^3$) 14 days | Average density (kg/m$^3$) 28 days | Average tensile Strength (MPa) 14 days | Average tensile Strength (MPa) 28 days |
|---|---|---|---|---|---|---|---|
| BOS60/BPD5/GGBS35 | 60 | 5 | 35 | 2304 | 2391 | 3.1 | 4.0 |
| BOS35/BPD35/GGBS30 | 35 | 35 | 30 | 2171 | 2221 | 3.7 | 4.8 |

The BOS50/BPD10/GGBS40 mixture shown in Table 12 above gives the highest strength. This paste was used for the making of the concrete paving blocks.

Figure 7:
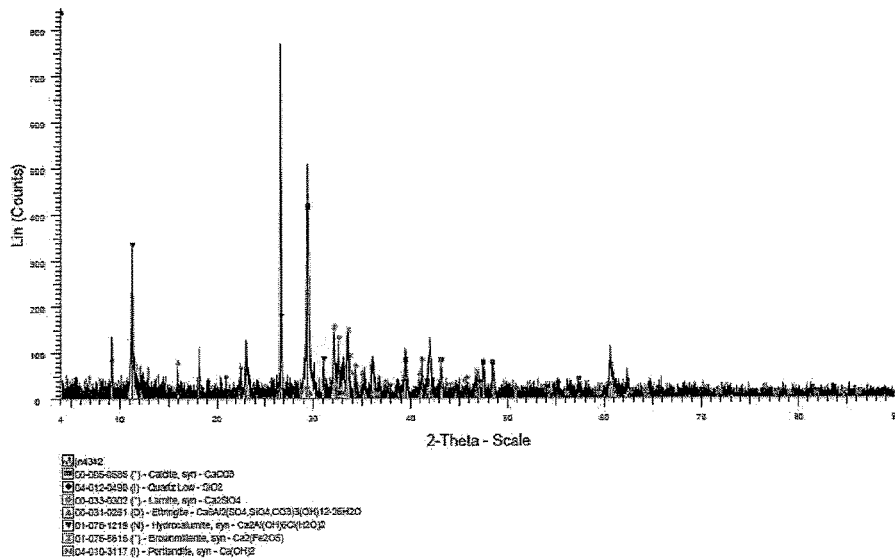
FIG. 7 shows the results of an X-ray diffraction (XRD) analysis of a BOS-BPD-GGBS mixture according to the invention carried out after 28 days.

Chemical analysis of the composition of the overall mixture was carried out using the XRF method. The results of XRD and XRF for this mixture are given in Table 13 and FIG. 7.

Since including aggregates as a constituent of the blocks would reduce their strength, the highest tensile strength mix of BOS50/BPD10/GGBS40 was chosen to continue the concrete paving block investigations.

TABLE 13

Chemical analysis of the BOS-BPD-GGBS

| SiO$_2$ | TiO$_2$ | Al$_2$O$_3$ | Fe$_2$O$_3$ | MnO | MgO | CaO | Na$_2$O | K$_2$O | P$_2$O$_5$ | SO$_3$ | LOI | Total |
|---|---|---|---|---|---|---|---|---|---|---|---|---|
| 21.11 | 0.51 | 6.33 | 12.36 | 1.92 | 6.53 | 39.22 | 0.32 | 0.45 | 0.63 | 1.10 | 8.70 | 99.17 |

EXAMPLE 4

Paving Blocks and Cement Mixes

Paving blocks were made with the same proportions as used in the factory-produced blocks, i.e. with 14% binder (but with no Portland cement, in contrast to factory-produced blocks) and with 86% stones (i.e. combined aggregates and sand). The mixtures used are given in Table 14. As it can be seen the mean tensile strength values are lower than the factory cement mix and the standard required strength. To improve this, 1.5 percent steel fibres (calculated as described above) were used to increase the required strength. This proved that using fibre with no Portland cement paste can achieve the necessary strength requirement of the paving blocks (see Table 15).

The binder (paste) amount was increased in mixes 3 (given in Table 16) and 4 (Table 17) to improve the strength further. Concrete blocks of mix 3 contained 28 percent by weight binder and the concrete blocks of mix 4 contained 42 percent by weight. The mix designs and results of these concrete mixes are given in Tables 16 and 17 respectively. In the last mixture (mix 5, Table 18) steel fibre was used to enhance the strength and reach the required tensile strength of above 3.6 MPa.

TABLE 14

Mix 1 - Mixture design and tensile splitting strength at 14 and 28 days for 14 percent binder.

| Code name BOS50/BPD10/GGBS40 Mix No. 1 | | | | | |
|---|---|---|---|---|---|
| BOS | BPD | GGBS | 4 mm-Dust | 6 mm Clean | Sand |
| 7% | 1.4% | 5.6% | 53% | 9% | 24% |

| | No | Age (days) | Mass (g) | Failure load (kN) | Failure length (mm) | Failure thickness (mm) | Density (kg/m$^3$) | Tensile Splitting strength (N/mm$^2$) | Mean Tensile Splitting strength (N/mm$^2$) |
|---|---|---|---|---|---|---|---|---|---|
| BLOCKS | 1 | 14 | 3543.0 | 23.1 | 190 | 76 | 2429.3 | 1.0 | 1.0 |
| | 2 | | 3551.0 | 23.9 | 190 | 76 | 2434.8 | 1.0 | |
| | 3 | | 3548.0 | 23.5 | 190 | 76 | 2432.7 | 1.0 | |
| | 1 | 28 | 3564.5 | 23.7 | 190 | 76 | 2444.0 | 1.0 | 1.1 |
| | 2 | | 3578.5 | 30.1 | 190 | 76 | 2453.6 | 1.3 | |

TABLE 14-continued

Mix 1 - Mixture design and tensile splitting strength at 14 and 28 days for 14 percent binder.

| | | | | | | |
|---|---|---|---|---|---|---|
| 3 | 3561.5 | 24.3 | 190 | 76 | 2441.9 | 1.1 |
| 4 | 3568.0 | 25.4 | 190 | 76 | 2446.4 | 1.1 |
| 5 | 3578.0 | 26.8 | 190 | 76 | 2453.3 | 1.1 |

TABLE 15

Mix 2 - Mixture design and tensile splitting strength at 14 and 28 days for 14 percent binder with steel fibre Code name BOS50/BPD10/GGBS40/Steel Fibre 1.5 Mix No. 2

| BOS | BPD | GGBS | 4 mm-Dust | 6 mm Clean | Steel Fibre | Sand |
|---|---|---|---|---|---|---|
| 7% | 1.4% | 5.6% | 53% | 9% | 1.5% | 24% |

| | No | Age (days) | Mass (g) | Failure load (kN) | Failure length (mm) | Failure thickness (mm) | Density (kg/m$^3$) | Tensile Splitting strength (N/mm$^2$) | Mean Tensile Splitting strength (N/mm$^2$) |
|---|---|---|---|---|---|---|---|---|---|
| BLOCKS | 1 | 14 | 3512.0 | 62.5 | 190 | 76 | 2408.1 | 2.7 | 2.5 |
| | 2 | | 3511.5 | 50.9 | 190 | 76 | 2407.7 | 2.2 | |
| | 3 | | 3507.0 | 57.8 | 190 | 76 | 2404.6 | 2.5 | |
| | 1 | 28 | 3517.5 | 67.1 | 190 | 76 | 2411.8 | 2.9 | 3.1 |
| | 2 | | 3519.5 | 76.3 | 190 | 76 | 2413.2 | 3.3 | |
| | 3 | | 3518.0 | 71.7 | 190 | 76 | 2412.2 | 3.1 | |
| | 4 | | 3516.5 | 66.8 | 190 | 76 | 2411.1 | 2.9 | |

TABLE 16

Mix 3 - Mixture design and tensile splitting strength at 14 and 28 days for 28 percent binder Code name BOS50/BPD10/GGBS40 Mix No. 3

| BOS | BPD | GGBS | 4 mm-Dust | 6 mm Clean | Sand |
|---|---|---|---|---|---|
| 14% | 2.8% | 11.2% | 44.4% | 7.5% | 20.1% |

| | No | Age (days) | Mass (g) | Failure load (kN) | Failure length (mm) | Failure thickness (mm) | Density (kg/m$^3$) | Tensile Splitting strength (N/mm$^2$) | Mean Tensile Splitting strength (N/mm$^2$) |
|---|---|---|---|---|---|---|---|---|---|
| BLOCKS | 1 | 14 | 3532.1 | 15.0 | 190 | 76 | 2437 | 0.65 | 0.69 |
| | 2 | | 3529.9 | 14.6 | 190 | 76 | 2436 | 0.63 | |
| | 3 | | 3533.0 | 18.3 | 190 | 76 | 2438 | 0.79 | |
| | 1 | 28 | 3560.0 | 32.6 | 190 | 76 | 2456 | 1.41 | 1.39 |
| | 2 | | 3558.5 | 31.9 | 190 | 76 | 2455 | 1.38 | |
| | 3 | | 3554.6 | 31.7 | 190 | 76 | 2453 | 1.37 | |

TABLE 17

Mix 4 - Mixture design and tensile splitting strength at 14 and 28 days for 42 percent binder Code name BOS5050/BPD10/GGBS40 Mix No. 4

| BOS | BPD | GGBS | 4 mm-Dust | 6 mm Clean | Sand |
|---|---|---|---|---|---|
| 21% | 4.2% | 16.8% | 35.7% | 6.1% | 16.2% |

| | No | Age (days) | Mass (g) | Failure load (kN) | Failure length (mm) | Failure thickness (mm) | Density (kg/m$^3$) | Tensile Splitting strength (N/mm$^2$) | Mean Tensile Splitting strength (N/mm$^2$) |
|---|---|---|---|---|---|---|---|---|---|
| BLOCKS | 1 | 14 | 3665.4 | 31.2 | 190 | 76 | 2529 | 1.35 | 1.35 |
| | 2 | | 3668.6 | 34.5 | 190 | 76 | 2531 | 1.49 | |
| | 3 | | 3663.5 | 27.9 | 190 | 76 | 2528 | 1.21 | |
| | 1 | 28 | 3666.0 | 45.1 | 190 | 76 | 2529 | 1.95 | 1.95 |
| | 2 | | 3669.5 | 46.5 | 190 | 76 | 2532 | 2.01 | |
| | 3 | | 3665.0 | 43.7 | 190 | 76 | 2529 | 1.89 | |

TABLE 18

Mix 5 - Mixture design and tensile splitting strength at 14 and 28 days for 28 percent binder with steel fibre Code name BOS50/BPD10/GGBS40 Steel Fibre 1.5 Mix No. 5

| BOS | BPD | GGBS | 4 mm-Dust | 6 mm Clean | Steel Fibre | Sand |
|---|---|---|---|---|---|---|
| 14% | 2.8% | 11.2% | 44.4% | 7.5% | 1.5% | 20.1% |

| | No | Age (days) | Mass (g) | Failure load (kN) | Failure length (mm) | Failure thickness (mm) | Density (kg/m$^3$) | Tensile Splitting strength (N/mm$^2$) | Mean Tensile Splitting strength (N/mm$^2$) |
|---|---|---|---|---|---|---|---|---|---|
| BLOCKS | 1 | 14 | 3619.0 | 77.7 | 190 | 76 | 2497 | 3.36 | 3.4 |
| | 2 | | 3622.0 | 78.4 | 190 | 76 | 2499 | 3.39 | |
| | 3 | | 3625.5 | 78.9 | 190 | 76 | 2502 | 3.41 | |
| | 1 | 28 | 3645.0 | 83.3 | 190 | 76 | 2515 | 3.75 | 3.7 |
| | 2 | | 3646.0 | 87.9 | 190 | 76 | 2516 | 3.67 | |
| | 3 | | 3648.0 | 82.4 | 190 | 76 | 2517 | 3.62 | |
| | 4 | | 3637.3 | 85.6 | 190 | 76 | 2510 | 3.56 | |

Table 19 shows the summary of the mix designs and tensile strength results for the five mixes made. As can be seen, mix 3, which has 28 percent binder (paste), can achieve the minimum required strength by adding steel fibres (this is mix 5). However as mix 4 has higher strength, this can also achieve the minimum strength requirement, but mix 4 has 42 percent binder and hence will increase the cost. Due to this reason, mix 3 was selected to add fibres into it.

As can be seen in Table 19, mix 5, containing 28% paste of BOS50/BPD10/GGBS40 with 72% stones and 1.5% steel fibre satisfies the BS EN 1338: 2003 minimum required tensile splitting strength of 3.6 MPa.

Mix 5 containing BOS 14%-BPD 2.8%-GGBS 11.2%-SF 1.5%-Agg. 51.9%-sand 20.1% with W/B of 0.15 satisfies all the requirements of BS EN 1338: 2003 standard including splitting tensile strength, skid/slip resistance, water absorption and freeze/thaw resistance.

TABLE 19

Summary of BOS/BPD/GGBS mixes made with and without 1.5% Steel fibre (percentage by weight).

| | | | | | | | | Tensile Strength (MPa) | |
|---|---|---|---|---|---|---|---|---|---|
| Mix No. | GGBS (%) | BPD (%) | BOS (%) | SF (%) | 4 mm (%) | 6 mm (%) | Sand (%) | 14 days | 28 days |
| Mix 1 (Table 14) | 5.6 | 1.4 | 7.0 | — | 53 | 9 | 24 | 1.0 | 1.1 |
| Mix 2 (Table 15) | 5.6 | 1.4 | 7.0 | 1.5 | 53 | 9 | 24 | 2.5 | 3.1 |
| Mix 3 (Table 16) | 11.2 | 2.8 | 14.0 | — | 44.4 | 7.5 | 20.1 | 0.69 | 1.39 |
| Mix 4 (Table 17) | 16.8 | 4.2 | 21.0 | — | 35.7 | 6.1 | 16.2 | 1.35 | 1.95 |
| Mix 5 (Table 18) | 11.2 | 2.8 | 14.0 | 1.5 | 44.4 | 7.5 | 20.1 | 3.4 | 3.7 |

This Portland cement-free mix is of the same consistency and properties as the conventional paving block mixtures and can be easily cast in the factory with the usual plant and machineries available.

Density Results:

The average measured densities of paving blocks that were made are presented in Tables 14-18. It can be seen that the densities for different groups are mainly in the same range due to the different specific gravities of the ingredients in each mix. The density ranges between approximately 2400 to 2530 kg/m$^3$ as expected.

Slip/Skid and Weathering Resistance Test Results:

Table 20 shows skid/slip resistance, water absorption and freeze/thaw resistance for the five mixes of BOS/BPD/GGBS shown in Table 19 and the two factory control mixes made in the laboratory to make them all have the same condition of casting, curing and testing.

TABLE 20

Durability test results

| Mix | Slip/Skid resistance (BPN) | Water absorption (%) | Freeze/thaw resistance (Kg/m$^2$) |
|---|---|---|---|
| Factory Mix I (Control Mix I) | 100 | 5.4 | All blocks <1.0 |
| Factory Mix II (Control Mix II) | 92 | 5.8 | |
| Mix 1 (BOS7/BPD1.4/GGBS5.6) | 92 | 5.9 | |
| Mix 2 (BOS7/BPD1.4/GGBS5.6/SF1.5) | 89 | 6.0 | |
| Mix 3 (BOS14/BPD2.8/GGBS11.2) | 90 | 5.8 | |
| Mix 4 (BOS21/BPD4.2/GGBS16.8) | 92 | 6.0 | |
| Mix 5 (BOS14/BPD2.8/GGBS11.2/SF1.5) | 93 | 5.9 | |

The results of slip/skid resistance show that all paving block mixes made in the laboratory have "excellent" (as defined in Table 9) skid resistant surfaces and the potential for slip is extremely low according to BS EN1338: 2003. In addition, the result of freeze/thaw resistance shows that all mixes meet the British standard of BS EN1338: 2003. On the other hand, the water absorption test should show a result of less than 6% according to the BS EN1338: 2003 standard.

EXAMPLE 5

Paving Block

Figure 8:
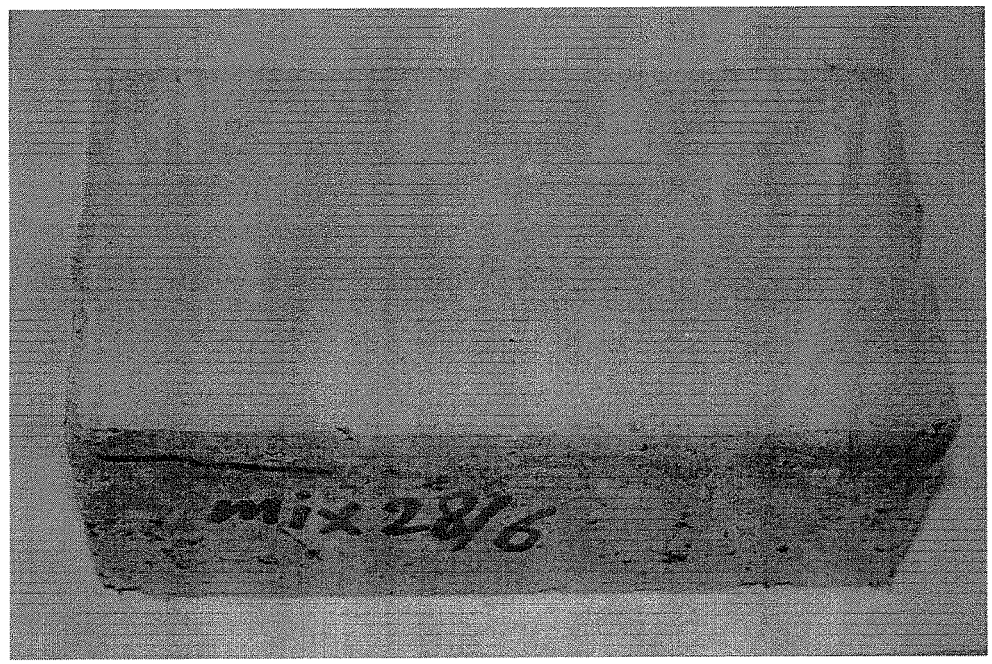
FIG. 8 shows a photograph of a paving block made using the binder composition of the invention (mix 5), taken after tensile testing was performed.

Paving blocks were made from mix 5 in Table 18. A photograph of one of these blocks is shown in FIG. 8. The top 10 mm surface is made without steel fibres but the main body of the blocks have the steel fibre. This is to make the blocks to have same surface texture as the conventional blocks in the market. The colour of the block is white/gray. The reddish colour is due to the colour of the aggregates and sand used.

Paving blocks made of this mixture satisfies all the industry standards and specifications. The mix is of the same consistency and properties as the conventional paving block mixtures. Even at 14 days, the characteristic splitting tensile strength of paving blocks prepared with ternary mixture of BOS50/BPD10/GGBS40 paste shows better results than the minimum required tensile strength of 3.6 MPa. This mix can be also used for factory production based on economic considerations.

The invention claimed is:

1. A binder composition which is free of Portland cement and which comprises:
    (a) ground granulated blast furnace slag (GGBS) in an amount of 30 to 60 wt. % by weight of binder composition on a dry solids basis,
    (b) basic oxygen slag (BOS) in an amount of 30 to 60 wt. % by weight of binder composition on a dry solids basis, and
    (c) an alkaline inorganic waste material selected from by-pass dust (BPD), cement kiln dust (CKD), and mixtures thereof, in an amount of 3 to 12 wt. % by weight of binder composition on a dry solids basis.

2. A binder composition as claimed in claim 1, wherein the alkaline inorganic waste material is BPD.

3. A binder composition as claimed in claim 1 which comprises:
    (a) GGBS in an amount of about 40 wt. % by weight of binder composition on a dry solids basis;
    (b) BOS in an amount of about 50 wt. % by weight of binder composition on a dry solids basis; and
    (c) BPD in an amount of about 10 wt. % by weight of binder composition on a dry solids basis.

4. A concrete mix comprising the following components (i) to (iv):
    (i) a binder composition as claimed in claim 1;
    (ii) aggregate;
    (iii) sand; and optionally
    (iv) fibres.

5. A concrete mix as claimed in claim 4 comprising about 5 to about 30 wt. % component (i) on a dry solids basis.

6. A concrete mix as claimed in claim 4 comprising about 40 to about 65 wt. % component (ii) on a dry solids basis.

7. A concrete mix as claimed in claim 4 comprising about 15 to about 25 wt. % component (iii) on a dry solids basis.

8. A concrete mix as claimed in claim 4 comprising about 1 to about 2 wt. % component (iv) based on a combined weight of components (i)-(iii) and, where present, any other non-fibre components.

9. A concrete mix as claimed in claim 4 comprising component (i) in an amount of about 28 wt. % on a dry solids basis, component (ii) in an amount of about 52 wt. % on a dry solids basis, component (iii) in an amount of about 20 wt. % on a dry solids basis, and component (iv) in an amount of about 1.5 wt. % based on a combined weight of components (i)-(iii).

10. A concrete mix as claimed in claim 4, wherein the fibres are metallic fibres.

11. A semi-dry composition comprising a concrete mix as claimed in claim 4 in combination with water.

12. A method of manufacturing a concrete article, the method comprising the steps of:
    (i) preparing a concrete mix as defined in claim 4;
    (ii) adding water whereby to form a semi-dry composition; and
    (iii) casting the semi-dry composition into a mould having a desired shape.

13. A method of manufacturing a multi-layered concrete article, the method comprising the steps of:
    (i) preparing a first concrete mix as defined in claim 4; and
    (ii) mixing said first concrete mix with water whereby to form a first semi-dry composition;
    (iii) pouring the first semi-dry composition into a mould having a desired shape;
    (iv) preparing a second concrete mix as defined in claim 4, wherein a composition of said second concrete mix is different from a composition of the first concrete mix;

(v) adding water to said second concrete mix whereby to form a second semidry composition; and (vi) pouring the second semi-dry composition into the mould whereby to form a layer on top of the first semi-dry composition.

14. A concrete article formed from a binder composition as defined in claim 1.

15. A concrete article as claimed in claim 14, wherein the article comprises a plurality of layers and wherein adjacent layers differ in composition.

16. A concrete article as claimed in claim 15, wherein the article comprises an upper layer which is free of fibres and a lower layer which comprises fibres.

17. A concrete article as claimed in claim 14 which is a paving block.

18. A paving block as claimed in claim 17 having at least one of the following properties as determined according to BS EN 1338:2003, (i) a minimum tensile strength of 3.6 MPa;

(ii) water absorption of less than 6%;

(iii) freeze-thaw resistance of <1.0 $Kg/m^2$; and (iv) a slip/skid resistance of at least 40 BPN.

19. A concrete article formed from a concrete mix as defined in claim 4.

20. A concrete article formed from a semi-dry composition as defined in claim 11.

* * * * *